(12) United States Patent
Fontaine

(10) Patent No.: US 11,088,837 B2
(45) Date of Patent: *Aug. 10, 2021

(54) RESIDENCE-BASED DIGITAL IDENTITY AND STRONG AUTHENTICATION SYSTEM

(71) Applicant: Hushmesh Inc., Falls Church, VA (US)

(72) Inventor: Jean-Emmanuel Fontaine, Falls Church, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/457,498

(22) Filed: Jun. 28, 2019

(65) Prior Publication Data

US 2019/0394043 A1 Dec. 26, 2019

Related U.S. Application Data

(63) Continuation of application No. 15/948,715, filed on Apr. 9, 2018, now Pat. No. 10,361,858.

(Continued)

(51) Int. Cl.
| | |
|---|---|
| *H04L 9/32* | (2006.01) |
| *H04L 9/12* | (2006.01) |
| *G06F 21/72* | (2013.01) |
| *H04L 29/06* | (2006.01) |
| *H04L 9/14* | (2006.01) |
| *H04L 9/30* | (2006.01) |
| *H04W 12/06* | (2021.01) |
| *H04W 12/79* | (2021.01) |
| *G06F 21/62* | (2013.01) |

(52) U.S. Cl.
CPC ............ *H04L 9/3226* (2013.01); *H04L 9/14* (2013.01); *H04L 9/30* (2013.01); *H04L 9/321* (2013.01); *H04L 9/3215* (2013.01); *H04L 9/3228* (2013.01); *H04L 63/08* (2013.01); *H04L 63/0815* (2013.01); *H04W 12/06* (2013.01); *H04W 12/79* (2021.01); *H04L 2209/42* (2013.01)

(58) Field of Classification Search
None
See application file for complete search history.

(56) References Cited

U.S. PATENT DOCUMENTS

| | | | |
|---|---|---|---|
| 7,418,596 B1 * | 8/2008 | Carroll | H04W 12/03 713/169 |
| 9,917,921 B2 * | 3/2018 | Erola | H04M 3/42153 |

(Continued)

*Primary Examiner* — Venkat Perungavoor
(74) *Attorney, Agent, or Firm* — Alexander Franco

(57) ABSTRACT

A system and associated methods provide digital identity and strong authentication management services for Internet users. The system includes a central, cloud-based, online service, referred to as a central service, which can manage user accounts. The system also includes dedicated, always-on, always-connected, cryptographically unique devices, referred to as beacons, located within the physical residences of its users. The central service associates each beacon with the residence address of its user by physically sending a unique address verification code by postal mail to the user's residence. The user presents the unique code to the beacon, and the beacon cryptographically confirms its identity and the unique code sent to the residence address back to the central service. The beacons can attest to users' identities and provide seamless strong authentication to third-party online service providers on behalf of those users.

18 Claims, 5 Drawing Sheets

Related U.S. Application Data

(60) Provisional application No. 62/483,016, filed on Apr. 7, 2017.

(56) References Cited

U.S. PATENT DOCUMENTS

| | | | |
|---|---|---|---|
| 2006/0073811 A1* | 4/2006 | Ekberg | H04W 12/06 455/411 |
| 2008/0154633 A1* | 6/2008 | Ishibashi | G10K 15/04 705/59 |
| 2012/0216034 A1* | 8/2012 | Chen | H04L 63/0209 713/153 |
| 2016/0119141 A1* | 4/2016 | Jing | H04L 9/3234 713/156 |
| 2016/0241405 A1* | 8/2016 | Jeong | H04L 63/0428 |
| 2017/0228726 A1* | 8/2017 | Bohanan | G06Q 20/4014 |
| 2019/0228143 A1* | 7/2019 | Guyomarc'h | H04W 12/06 |
| 2020/0153650 A1* | 5/2020 | Yang | G01S 17/931 |

* cited by examiner

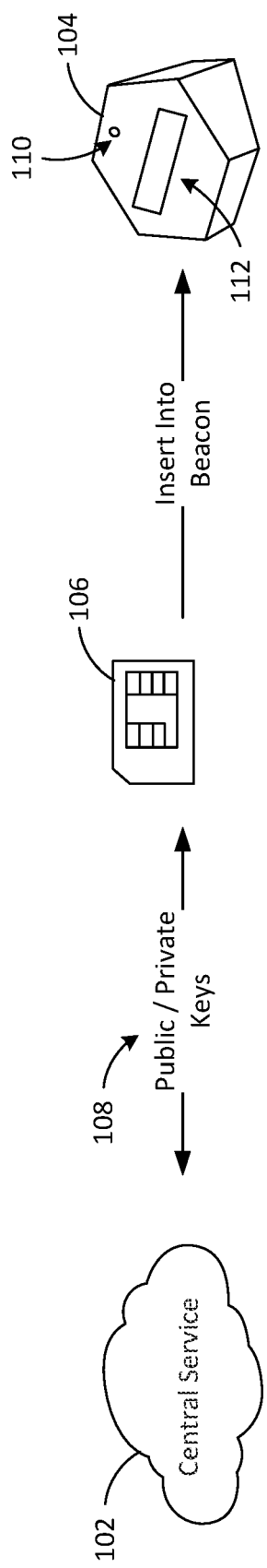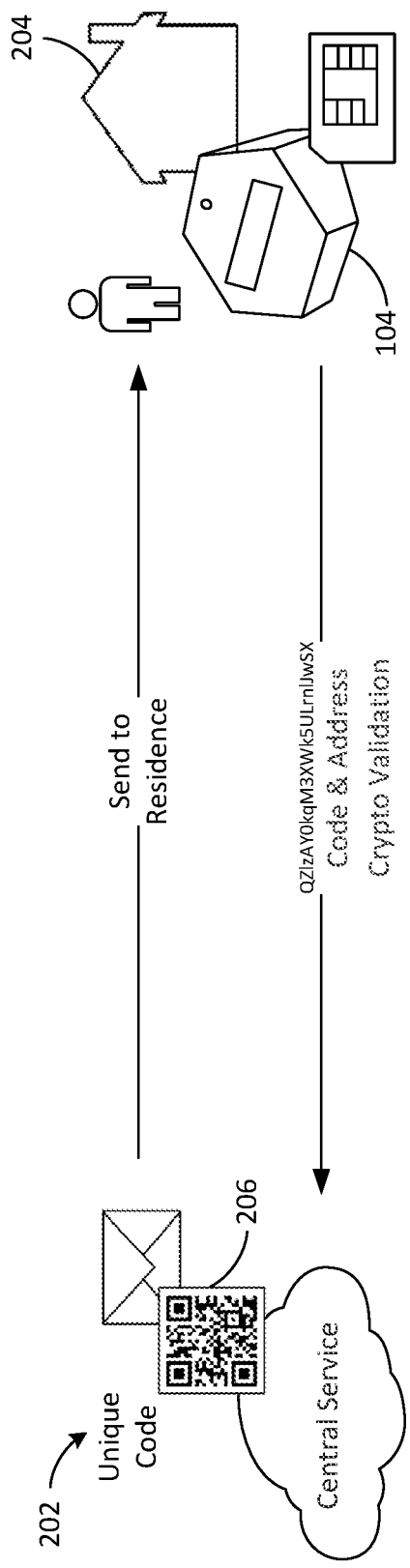

RESIDENCE-BASED DIGITAL IDENTITY AND STRONG AUTHENTICATION SYSTEM

RELATED APPLICATIONS

The subject matter of this application is related to U.S. application Ser. No. 15/948,715, filed on 2018 Apr. 9 and U.S. Provisional Application No. 62/483,016, filed on 2017 Apr. 7, all of which applications are incorporated herein by reference in their entireties.

BACKGROUND OF THE INVENTION

With every Internet service becoming more and more personalized on an ever growing number of Internet-connected devices, authenticating online users continues to create significant security challenges for practically every organization that offers online services. Traditionally, authentication methods have been categorized according to specific authentication factors such as "something you know" (e.g. passwords), "something you have" (e.g. a security token) and "something you are" (e.g. a fingerprint). Several multifactor authentication approaches exist that use combinations of those factors to deliver stronger authentication than any single factor alone.

Each traditional factor has advantages and drawbacks rooted in the conflicting needs for stronger security (i.e. make it difficult for unauthorized persons to crack) and ease of use (i.e. make the authentication experience as seamless as possible for authorized persons). Hence, the quest continues for solutions that not only provide strong security, but do so while delivering seamlessness and great convenience for its users.

Adding to the challenges of traditional solutions is that security measures are commonly architected around individual services operated by independent providers. As a result, Internet users struggle to deal with a confusing array of technology solutions that vary widely from one online service to the next. Because users' personal information is increasingly stored by practically every provider for a variety purposes, this patchwork approach to authentication perpetuates, and sometimes exacerbates, personal privacy and security issues. Providers with the weaker approach become the obvious targets for identity theft, making users' personal information vulnerable in spite of stronger measures that may be adopted by other providers.

SUMMARY OF THE INVENTION

A system and associated methods provide digital identity and strong authentication management services for Internet users. The system includes a central, cloud-based, online service, referred to as a central service, which can manage user accounts. The system also includes dedicated, always-on, always-connected, cryptographically unique devices, referred to as beacons, located within the physical residences of its users. The central service associates each beacon with the residence address of its user by physically sending a unique address verification code by postal mail to the user's residence. The user presents the unique code to the beacon, and the beacon cryptographically confirms its identity and the unique code sent to the residence address back to the central service. The beacons can attest to users' identities and provide seamless strong authentication to third-party online service providers on behalf of those users.

Beacons can manage random aliases, passwords and cryptographic material on behalf of their users to enable secure, private, one-to-one connections among users, and between users and third-party services. As a cryptographically unique physical device hosted in the user's home, each beacon can be "something you have", but without requiring the user to carry it around everywhere, as it can be always accessible online through the central service. Once verified by postal mail, each beacon can leverage its user's home address as a real-world proxy of "who you are".

The system can support multifactor authentication that combines the best properties of traditional authentication factors into one seamless, yet strong digital identity. The system can replace the many passwords that users typically maintain ("something you know") with strong random strings that beacons can dynamically manage on behalf of their users. The system can provide end-to-end security and privacy among users and between a user and participating third-party services. The system can support anonymous trust and anonymity with accountability across participating services. The system can leverage a verified indication of "where you reside" to extend or supersede the traditional "something you know", "something you have" and "something you are" authentication factors.

BRIEF DESCRIPTION OF THE DRAWINGS

FIG. 1 illustrates a central service establishing a pre-existing cryptographic relationship with a beacon.

FIG. 2 illustrates a central service associating a user's residence address with a beacon.

DETAILED DESCRIPTION

Figure 3:
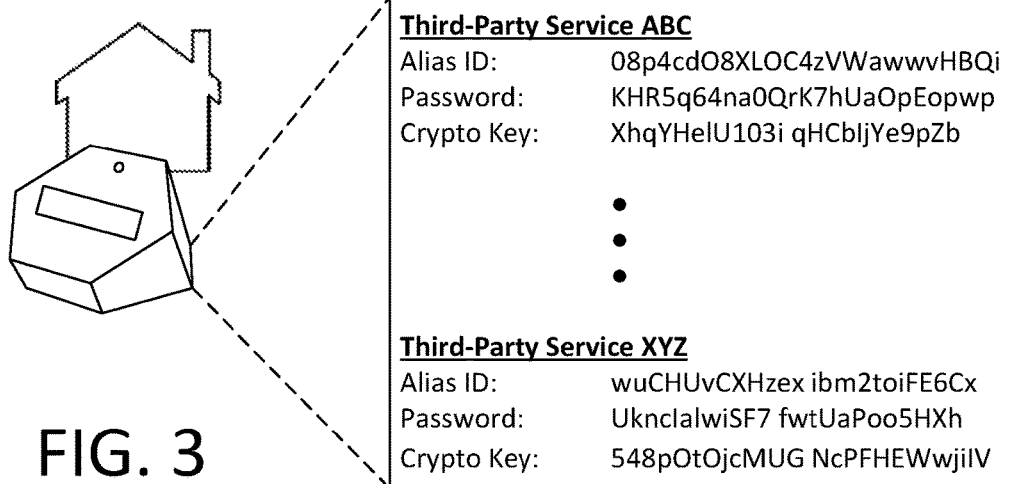
FIG. 3 illustrates that a beacon can create, store and dynamically manage random alias identities, passwords and any other cryptographic material such as keys on behalf of its users for a third-party service.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

A system includes a central, cloud-based, online service, referred to as a central service, which can manage user accounts. The system also includes dedicated, always-on, always-connected, cryptographically unique devices, referred to as beacons, located within the physical residences of its users. The term beacon is used in this specification merely as a fanciful name for a component of the system, and no association between the use of the term and dictionary definitions of the term or uses of the term in the related art is intended. Each cryptographically verified beacon communicates with the central service and acts as a trusted digital proxy to identify and strongly authenticate an associated user when accessing the user's account on the central service. The beacons can be configured to communicate exclusively with the central service. Through application programming interfaces (APIs) offered by the central service, third-party service providers can query identity information from the account and indirectly leverage the beacon to validate the user's authentication requests.

FIG. 1 illustrates how the central service 102 can establish a pre-existing cryptographic relationship with each beacon 104 in one embodiment. The central service can issue trusted and secure cryptographic cards or chips 106, and exchanges cryptographic material 108 (two-way public keys for instance) with them upon issuance. The trusted and secure cryptographic cards or chips can be inserted into beacons either at manufacturing or at a later time. Once deployed in users' homes, beacons can leverage the cards or chips to securely connect back to, and establish a cryptographically trusted and private connection with the central service. The beacon 104 can be equipped with an embedded camera 110 and/or a display 112 to support user input and/or output. To provide input to the device, the camera 110 can be used to scan machine-readable codes, such as QR codes.

The central service can associate or validate the user's address of residence on the account with a beacon hosted at the user's address by sending an initial unique activation code to the residence of the user by private postal mail (e.g. in a sealed envelope as illustrated in FIG. 2). Upon physical reception of the activation code, the user physically presents the code to the beacon, and the beacon cryptographically confirms the receipt of the code to the central service. A third-party service provider can also initiate a subsequent verification of the user's address of residence through the central service's APIs. To do this, the central service can generate a unique verification code and pass the code to the third-party service provider. The third-party service provider can then send the verification code to the residence of the user by private postal mail (e.g. in some official mailing like a bill or account statement) and the user can present the code to be beacon, which confirms receipt of the code to the central service.

In one embodiment, the system uses printed and mailed QR codes and a built-in camera in the beacon to scan the QR codes to associate or validate the addresses of beacons. Using a visual transmission mechanism, such as scanning printed QR codes, requires that the user have physical access to the beacon to present the code. Requiring physical access to a beacon kept in the user's private home adds stronger authentication to the system and precludes users who do not have physical access to the beacon from being associated with the beacon. Visual codes such as QR codes are very practical as they can be printed on practically anything (e.g. a printed bill), or can be displayed on any device screen (e.g. a smartphone). Consumers have also grown accustomed to the act of scanning codes when grocery shopping or boarding airplanes.

FIG. 2 illustrates how the central service can associate a user's residence address to his or her beacon. The central service sends a unique code 202 to the user's residence 204 by postal mail. In FIG. 2, the code 202 is encoded in a mailed QR code 206, but other ways of physically sending the unique code to the user's residence can be used. Once the user receives the unique code, they present it to the beacon for input. If a QR code is used, the code can be scanned by the beacon's embedded camera 110. Other ways of physically presenting and entering the unique code into the beacon can alternatively be used. Once the beacon has received the code, it uses cryptographic techniques to validate the reception of the unique code with the central service and thereby complete the association of the beacon with the residence address.

FIG. 3 illustrates that each beacon can create, store and dynamically manage random alias identities, passwords and any other cryptographic material such as keys on behalf of its user for a third-party service. FIG. 3 shows, by way of example, three types of data elements including Alias ID, Password, and Crypto Key for each of two third-party services. This example, however, should not be understood as limiting the type or the amount of information that beacons can manage for each third-party service, or the number of services.

In one embodiment, users can securely register Internet-connected devices, such as personal computers, laptops, tablets, phones or Internet of things (IoT) devices with their accounts on the central service. To register a device, the user navigates to an online portal hosted by the central service and goes through a device-specific registration. To securely confirm the registration of the device on the account, the central service sends a unique electronic code to the beacon associated with the account. The user then uses the device being registered to enter that unique code on the online portal to complete the device registration. The central service then associates the device with the user account for later device verifications (adding additional trust and security, i.e. a familiar device that the user explicitly registered) whenever the user seeks access to third-party services. In one embodiment, some unique device identifier, such as MAC address, cookie or other identifier, can be conveyed through this transaction from the device to the central service to enable the central service to recognize the device as registered for future uses.

Figure 4:
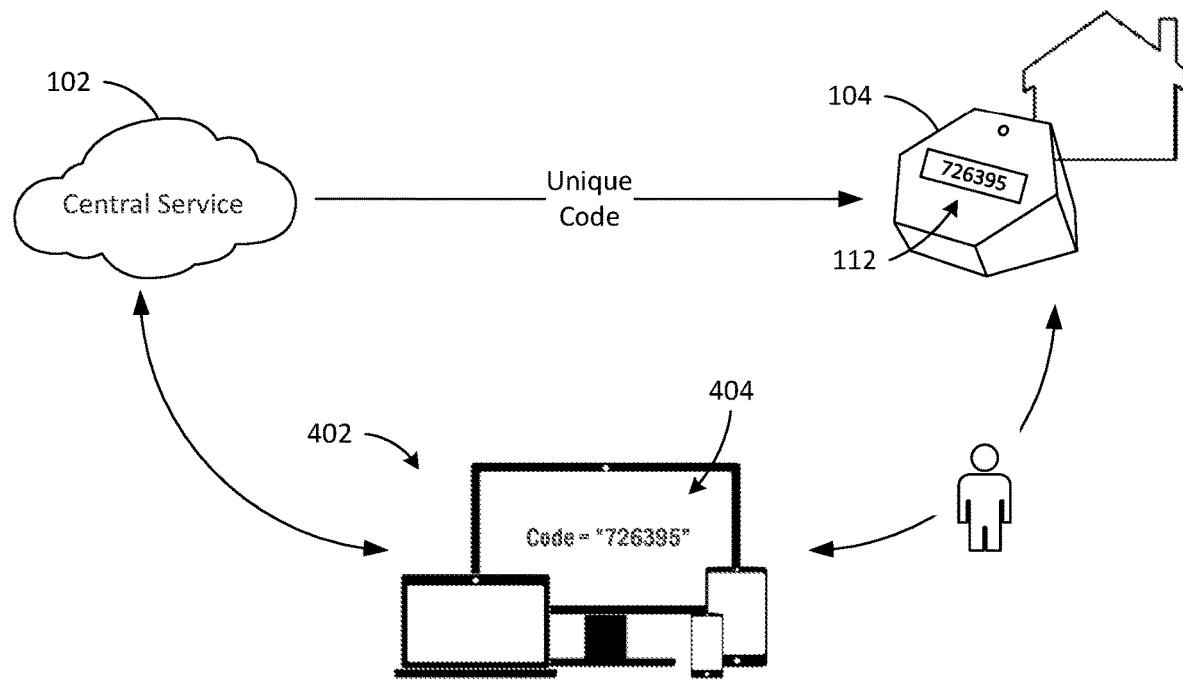
FIG. 4 illustrates how users can register Internet devices with the central service through a beacon.

FIG. 4 illustrates how users can register Internet devices with the central service through a beacon in accordance with one embodiment. The central service 102 and the beacon 104 agree on a unique random code to confirm the registration of a device. As illustrated in FIG. 4, the unique random code can be, for example, a 6-digit number displayed on a display 112 on the beacon. The user then enters the code on the central service registration portal 404 through the device to validate and confirm the device registration. A unique device identifier, such as MAC address, cookie or other identifier, is conveyed through this transaction to enable the central service to recognize the device as registered for future uses. Other ways to communicate the unique random code to the user or to the device 402 through the beacon can be used. For example, the beacon can display a QR code on its screen that can be scanned by a device such as a smartphone or tablet to register the device.

Figure 5A:
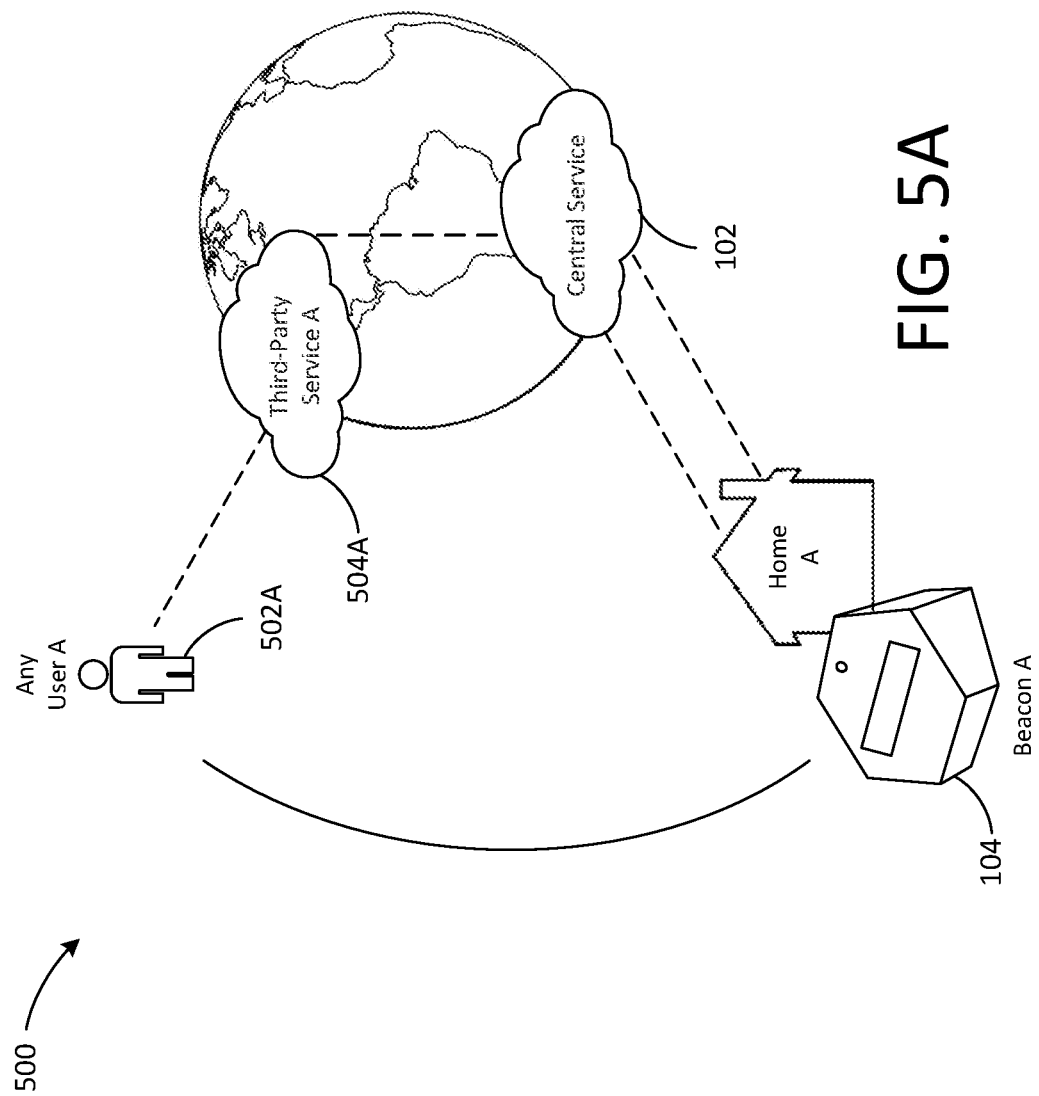
FIG. 5A illustrates that the system can support instant single sign-on, end-to-end security and privacy between a user and a third-party service.

FIG. 5A illustrates that the system 500 can support instant single sign-on, end-to-end security and privacy between a user A 502A and a third-party service 504A in accordance with one embodiment. When user A accesses third-party service A, service A interacts with the central service 102 to seek identity and credential information from the user account on the central service. If user A is using a registered device, the central service can retrieve the user A account based on the unique device identifier that was set during registration of the device. User A may or may not be prompted to provide credentials to the central service based on user security preferences for the specific third-party service A. If user A is not using a registered device, the central service can require user A to provide his or her identity to access their account. In one embodiment, user A's identity can be their real name and home address. Using a user-supplied name and address, the central service can connect to beacon A 104A hosted in the home A of user A, at which point user A can provide their credentials to be verified by beacon A. Beacon A then transmits the results of the authentication to the central service 102. If authentication with beacon A is successful, beacon A can provide the central service with information it holds for third-party service A on behalf of user A. This information can include, for example, a specific alias ID, password and/or any other cryptographic material to establish a trusted and/or private connection between user A and service A. Should the third-party service A need any further assistance from the central service for any other security and/or privacy purpose, both services have complete context to do so transparently on behalf of user A.

Figure 5B:
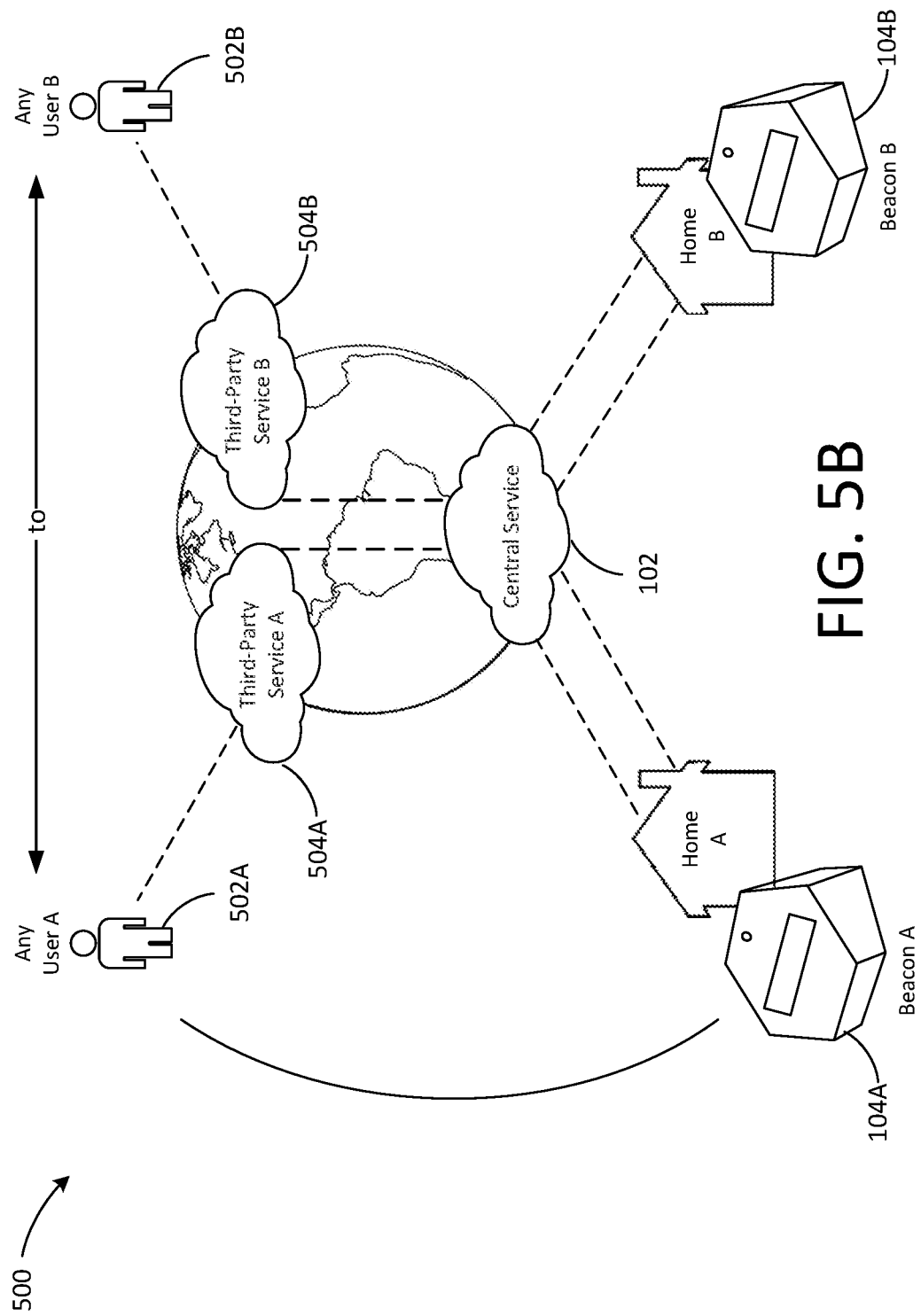
FIG. 5B illustrates that multiple users using multiple third-party services can obtain end-to-end security and privacy across a combination of users and third-party services.

FIG. 5B illustrates how any multiple users using multiple third-party services can enjoy end-to-end security and privacy across any combination of users and third-party services. FIG. 5B shows user A 502A accessing third-party service A 504A and user B 502B accessing third-party service B 504B, each in accordance with the procedures illustrated in FIG. 5A. Note that FIG. 5A can be generalized to any number of users and third-party services. Once users A and B are respectively granted access to third-party services A and B, the central service 102 is aware of the full context for each user across services A and B and can communicate with beacons A and B to equip both users with whatever cryptographic material they need to establish an end-to-end secure and private connection directly between user A and B.

In one aspect, the system can support seamless and strongly authenticated single sign-on across a third-party service from the very first interaction. A user can point third-party services to use their account on the central service. The central service can instruct the user's beacon to generate unique user identities, credentials and any other necessary cryptographic materials to establish a completely private, secure end-to-end digital relationship between the user and the third-party service.

In one aspect, the system incorporates a novel combination of authentication factors including a verified residence associated with an online beacon, which can be referred to as "where you reside". By associating an always-on, always-connected beacon to the physical residence of a user, the system creates a combination of "what you know", "what you have" and "what you are". The beacon can be configured to store a large number of dynamically changing credentials which can replace passwords that users traditionally have to "know". By placing and keeping the beacon in the user's residence, the user "has" the beacon in his or her private possession without having to actually carry it around. By associating the beacon with the user's residence address, the system leverages the user's home address as a legal proxy for who each user "is". Unlike other multifactor solutions, the novel combination of authentication factors can be effected seamlessly and transparently to the user as all identity and authentication transactions between third-party services, the central service, and the beacon can happen in real time in the background.

In one aspect, the system can provide seamless identification and strong authentication of any beacon user to a third-party service. In one aspect, the system can provide end-to-end, secure and private connections between any two beacon users within one or across multiple third-party services. In one aspect, the system uses actual addresses of residence in the physical world, as verified by private postal mail, as anchor points for users' digital identities, with aliases managed and maintained by users' beacons in their homes. The accounts created on the central service, therefore, can be universal, neutral and completely independent from third-party services.

In one aspect, the system can leverage a cryptographically unique beacon to manage all of a user's aliases and credentials across third-party services. The system can therefore support "anonymity with accountability" which is a highly desirable property for all online services. In one aspect, each beacon can create and keep track of aliases across third-party services, and therefore users can access those services without necessarily disclosing their real-life identity. In one aspect, all of a user's aliases can be tied to their cryptographically unique beacon, which beacon is itself tied to the user's real-life identity through a home address. Accountability rules can therefore be enforced to combat anonymous abuses on any third-party service.

In one aspect, the cryptographically unique beacon can manage all of a user's aliases and credentials across third-party services. The system can therefore support "trustworthy anonymity" which is a highly desirable property for all online services. In one aspect, each beacon can strongly authenticate its user across all third-party services even when using different aliases, and therefore algorithms can be used to aggregate and calculate a given trust score for that user across all such services. Such a trust score can be used to qualify the user to any other third-party service even when the user is using an anonymous alias. This trust score can be used to support trust across the Internet, empowering all users and third-party service providers to interact in confidence based on anonymous, yet auditable trust scores.

Computer Implementation

Components of the embodiments disclosed herein, which may be referred to as services, servers, devices, methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 6:
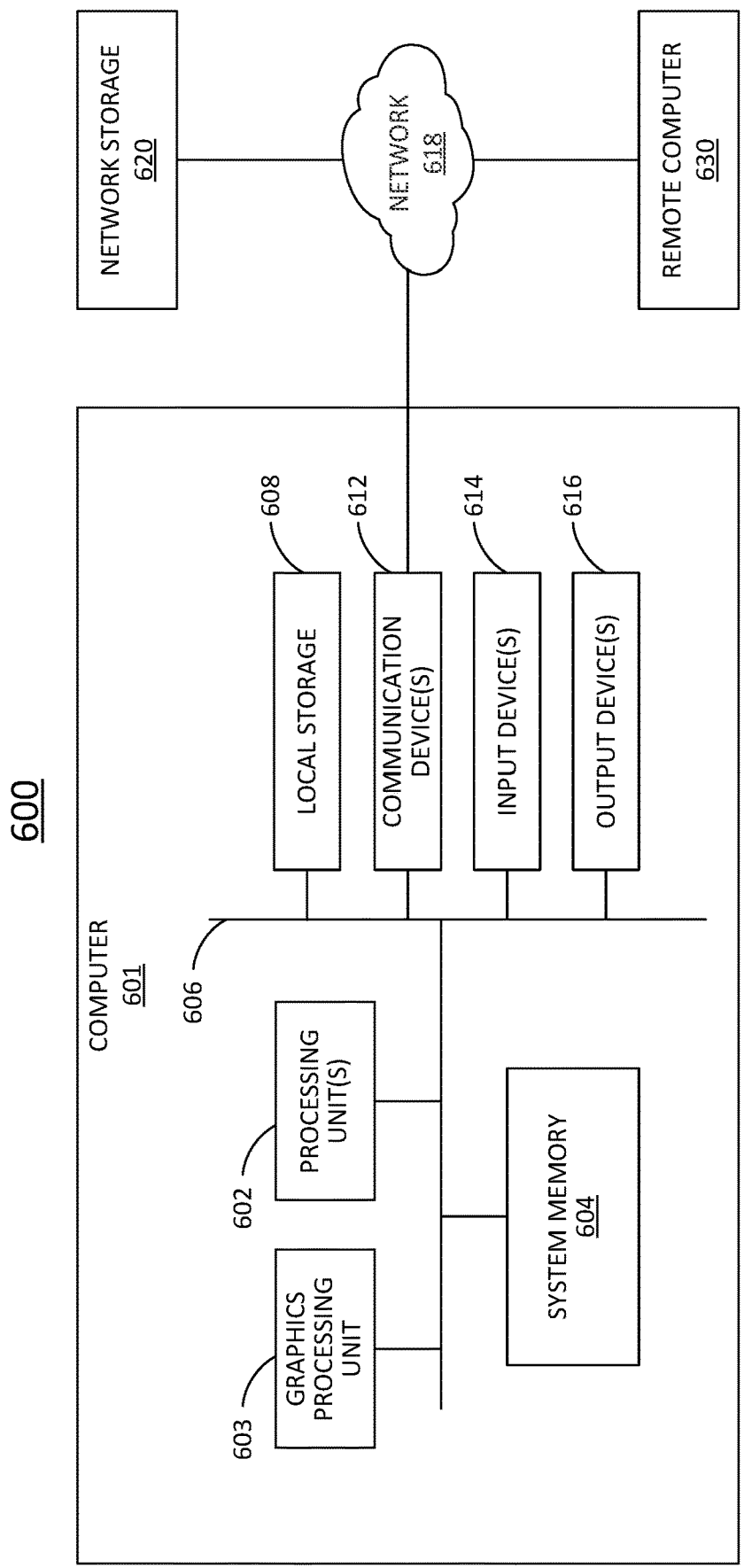
FIG. 6 illustrates a general computer architecture that can be appropriately configured to implement components disclosed in accordance with various embodiments.

FIG. 6 illustrates a general computer architecture 600 that can be appropriately configured to implement components disclosed in accordance with various embodiments. The computing architecture 600 can include various common computing elements, such as a computer 601, a network 618, and one or more remote computers 630. The embodiments disclosed herein, however, are not limited to implementation by the general computing architecture 600.

Referring to FIG. 6, the computer 601 can be any of a variety of general purpose computers such as, for example, a server, a desktop computer, a laptop computer, a tablet computer or a mobile computing device. The computer 601 can include a processing unit 602, a system memory 604 and a system bus 606.

The processing unit 602 can be any of various commercially available computer processors that can include one or more processing cores, which can operate independently of each other. Additional co-processing units, such as a graphics processing unit 603, also can be present in the computer.

The system memory 604 can include volatile devices, such as dynamic random access memory (DRAM) or other random access memory devices. The system memory 604 can also or alternatively include non-volatile devices, such as a read-only memory or flash memory.

The computer 601 can include local non-volatile secondary storage 608 such as a disk drive, solid state disk, or removable memory card. The local storage 608 can include one or more removable and/or non-removable storage units. The local storage 608 can be used to store an operating system that initiates and manages various applications that execute on the computer. The local storage 608 can also be used to store special purpose software configured to implement the components of the embodiments disclosed herein and that can be executed as one or more applications under the operating system.

The computer 601 can also include communication device(s) 612 through which the computer communicates with other devices, such as one or more remote computers 630, over wired and/or wireless computer networks 618. Communications device(s) 612 can include, for example, a network interface for communicating data over a wired computer network. The communication device(s) 612 can include, for example, one or more radio transmitters for communications over Wi-Fi, Bluetooth, and/or mobile telephone networks.

The computer 601 can also access network storage 620 through the computer network 618. The network storage can include, for example, a network attached storage device located on a local network, or cloud-based storage hosted at one or more remote data centers. The operating system and/or special purpose software can alternatively be stored in the network storage 620.

The computer 601 can have various input device(s) 614 such as a keyboard, mouse, touchscreen, camera, microphone, accelerometer, thermometer, magnetometer, or any other sensor. Output device(s) 616 such as a display, speakers, printer, eccentric rotating mass vibration motor can also be included.

The various storage 608, communication device(s) 612, output devices 616 and input devices 614 can be integrated within a housing of the computer, or can be connected through various input/output interface devices on the computer, in which case the reference numbers 608, 612, 614 and 616 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Program-specific Integrated Circuits (ASICs), Program-specific Standard Products (ASSPs), System-on-a-chip systems (SOCs), and Complex Programmable Logic Devices (CPLDs).

Aspects of Various Embodiments

In one aspect, a method includes operating an online service configured to receive requests for access by a plurality of users to a plurality of third-party services; and for each user of the plurality of users: deploying a network-connected always-on cryptographic server in a residence of the user, wherein the cryptographic server has a cryptographic relationship established with the online service prior to the deploying; sending a code by postal mail to the user at the residence; in response to the user presenting the mailed code to the cryptographic server, receiving a transmission by the cryptographic server at the online service; the online service validating the residence of the user in association with the cryptographic server based on the received transmission and based on the pre-existing cryptographic relationship; in response to the online service receiving a request for access by the user to a third-party service, the cryptographic server receiving credentials from the user; and in response to receiving the credentials, the cryptographic server authenticating the user.

In one aspect, the deployed cryptographic server is configured to communicate exclusively with the online service.

In one aspect, the cryptographic server includes a trusted and secure cryptographic chip inserted at manufacture time.

In one aspect, the cryptographic relationship is based on an exchange of public keys between the cryptographic server and the central service.

In one aspect, the method further includes, for the each user: establishing a trusted connection between the deployed cryptographic server and the online service based on the pre-existing cryptographic relationship, wherein the receiving a transmission by the cryptographic server at the online service uses the trusted connection.

In one aspect, the transmission by the cryptographic server includes the code.

In one aspect, the cryptographic server is equipped with a local camera, the code is mailed in a form of a printed QR code, and the user scans the QR code with the camera.

In one aspect, the method further includes, for the each user: in response to a request by the third-party service to initiate a verification of the user's address of residence, the online service transmitting a verification code to the third-party service, wherein the third-party service causes the verification code to be sent to the user at the residence by postal mail; and in response to the user presenting the mailed verification code to the cryptographic server, receiving a transmission by the cryptographic server at the online service, whereby the user's address of residence is verified.

In one aspect, the online service generates the verification code.

In one aspect, the cryptographic server is equipped with a local camera, the code and the subsequent code are mailed in a form of a printed QR code, and the user scans the QR codes with the camera.

In one aspect, the method further includes, for the each user, the cryptographic server creating and storing at least one of an alias identity, a password, and a cryptographic key for the third-party service on behalf of the user.

In one aspect, the method further includes, for the each user: confirming an Internet-connected device by passing a registration code in a circuit including the online service, the cryptographic server and the Internet-connected device.

In one aspect, the method further includes, for the each user: in response to the confirming, registering the Internet-connected device with a unique identifier, wherein the request for access by the user to a third party service is received from the registered Internet-connected device and includes the unique device identifier.

In one aspect, the cryptographic server is equipped with a display, and the confirming an Internet-connected device includes: the cryptographic server displaying a registration code on the display; and the registration code being provided to the online service through the Internet-connected device.

In one aspect, the registration code is displayed in a form of a QR code, and the QR code is scanned by the Internet-connected device.

In one aspect, the confirming an Internet-connected device further includes: the online service sending the registration code to the cryptographic server.

In one aspect, the cryptographic server authenticating the user supports single sign-on between the user and the third-party service.

In one aspect, the method further includes, for the each user: the online service associating an identity of the user with the cryptographic server; in response to the online service receiving the request for access by the user to the third-party service, the online service requesting an identity from the user; and in response to the online service receiving the identity from the user, the online service connecting to the cryptographic server.

In one aspect, a method includes: operating an online service configured to receive requests for access by a plurality of users to a plurality of third-party services; and for each user of the plurality of users: deploying a network-connected always-on cryptographic server in a residence of the user, wherein the cryptographic server has a cryptographic relationship established with the online service prior to the deploying; establishing a trusted connection between the deployed cryptographic server and the online service based on the pre-existing cryptographic relationship; sending a code by postal mail to the user at the residence; in response to the user presenting the mailed code to the cryptographic server, receiving a transmission by the cryptographic server at the online service; the online service validating the residence of the user in association with the cryptographic server based on the received transmission and based on the pre-existing cryptographic relationship; confirming an Internet-connected device by passing a registration code in a circuit including the online service, the cryptographic server and the Internet-connected device; in response to the confirming, the online service registering the Internet-connected device as associated with the user; the online service receiving a request for access by the user to a third-party service through the Internet-connected device; in response to the online service recognizing the Internet-connected device in association with the request for access, the online service connecting to the cryptographic server; and in response to at least the online service connecting to the cryptographic server, the cryptographic server providing to the online service information that the cryptographic server holds for the third-party service on behalf of the user.

In one aspect, the information includes at least one of an alias identity, a password, and a cryptographic key for the third-party service.

In one aspect, the method further includes, for the each user: further in response to the online service recognizing the Internet-connected device in association with the request for access, prompting the user to provide credentials; and in response to receiving the credentials, the cryptographic server authenticating the user.

In one aspect, the cryptographic server authenticating the user supports single sign-on between the user and the third-party service.

In one aspect, the deployed cryptographic server is configured to communicate exclusively with the online service.

In one aspect, the cryptographic server includes a trusted and secure cryptographic chip inserted at manufacture time.

In one aspect, the cryptographic relationship is based on an exchange of public keys between the cryptographic server and the central service.

In one aspect, the method further includes, for the each user: establishing a trusted connection between the deployed cryptographic server and the online service based on the pre-existing cryptographic relationship, wherein the receiving a transmission by the cryptographic server at the online service uses the trusted connection.

In one aspect, the transmission by the cryptographic server includes the code.

In one aspect, the cryptographic server is equipped with a local camera, wherein the code is mailed in a form of a printed QR code, and wherein the user scans the QR code with the camera.

In one aspect, the method further includes, for the each user: in response to a request by the third-party service to initiate a verification of the user's address of residence, the online service transmitting a verification code to the third-party service, wherein the third-party service causes the verification code to be sent to the user at the residence by postal mail; and in response to the user presenting the mailed verification code to the cryptographic server, receiving a transmission by the cryptographic server at the online service, whereby the user's address of residence is verified.

In one aspect, the online service generates the verification code.

In one aspect, the cryptographic server is equipped with a local camera, the code and the subsequent code are mailed in a form of a printed QR code, and the user scans the QR codes with the camera.

In one aspect, the method further includes, for the each user: the cryptographic server creating and storing at least one of an alias identity, a password, and a cryptographic key for the third-party service on behalf of the user.

In one aspect, the registering the Internet-connected device includes the central service receiving a unique device identifier from the Internet-connected device, and the request for access by the user to a third party service includes the unique device identifier.

In one aspect, the cryptographic server is equipped with a display, and the confirming an Internet-connected device includes: the cryptographic server displaying a registration code on the display; and the registration code being provided to the online service through the Internet-connected device.

In one aspect, the registration code is displayed in a form of a QR code, and the QR code is scanned by the Internet-connected device.

In one aspect, the confirming an Internet-connected device further includes: the online service sending the registration code to the cryptographic server.

In one aspect, a system includes one or more computers operating an online service and a plurality of cryptographic servers, wherein the one or more computers and the plurality of cryptographic servers are configured to perform any one or more of the foregoing methods.

In one aspect, one or more non-transitory computer-readable media contain instructions that, when executed by one or more processors of one or more computers and a plurality of cryptographic servers, cause the one or more computers and the plurality of cryptographic servers to perform any one or more of the foregoing methods.

CON-CLUSION

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims that follow, the term "based upon" shall include situations in which a factor is taken into account directly and/or indirectly, and possibly in conjunction with other factors, in producing a result or effect. The term "in response to" shall include situations in which an occurrence of a condition is a direct or indirect precondition to the performance of a subsequent action. A portion shall include greater than none and up to the whole of a thing. Encryption of a thing shall include encryption of a portion of the thing.

The invention claimed is:
1. A method comprising:
operating an online service configured to receive requests for access by a plurality of users to a plurality of third-party services; and
for each user of the plurality of users:
deploying a network-connected always-on cryptographic server in a residence of the user, wherein the cryptographic server has a cryptographic relationship established with the online service prior to the deploying;
sending a code by postal mail to the user at the residence;
in response to the user presenting the mailed code to the cryptographic server, receiving a transmission by the cryptographic server at the online service;
the online service validating the residence of the user in association with the cryptographic server based on the received transmission and based on the established cryptographic relationship;
in response to the online service receiving a request for access by the user to a third-party service, the cryptographic server receiving credentials from the user; and
in response to receiving the credentials, the cryptographic server authenticating the user.

2. The method of claim 1, wherein the deployed cryptographic server is configured to communicate exclusively with the online service.

3. The method of claim 1, wherein the cryptographic server comprises a trusted and secure cryptographic chip inserted at manufacture time.

4. The method of claim 1, wherein the cryptographic relationship is based on an exchange of public keys between the cryptographic server and the online service.

5. The method of claim 1, further comprising, for the each user:
establishing a trusted connection between the deployed cryptographic server and the online service based on the established cryptographic relationship, wherein the receiving a transmission by the cryptographic server at the online service uses the trusted connection.

6. The method of claim 1, wherein the transmission by the cryptographic server includes the code.

7. The method of claim 1, wherein the cryptographic server is equipped with a local camera, wherein the code is mailed in a form of a printed QR code, and wherein the user scans the QR code with the camera.

8. The method of claim 1, further comprising, for the each user:
in response to a request by the third-party service to initiate a verification of the user's address of residence, the online service transmitting a verification code to the third-party service, wherein the third-party service causes the verification code to be sent to the user at the residence by postal mail; and
in response to the user presenting the mailed verification code to the cryptographic server, receiving a transmission by the cryptographic server at the online service, whereby the user's address of residence is verified.

9. The method of claim 8, wherein the online service generates the verification code.

10. The method of claim 8, wherein the cryptographic server is equipped with a local camera, wherein the code and the subsequent code are mailed in a form of a printed QR code, and wherein the user scans the QR codes with the camera.

11. The method of claim 1, further comprising, for the each user, the cryptographic server creating and storing at least one of an alias identity, a password, and a cryptographic key for the third-party service on behalf of the user.

12. The method of claim 1, further comprising, for the each user:
confirming an Internet-connected device by passing a registration code in a circuit including the online service, the cryptographic server and the Internet-connected device.

13. The method of claim 12, further comprising, for the each user:
in response to the confirming, registering the Internet-connected device with a unique identifier,
wherein the request for access by the user to a third party service is received from the registered Internet-connected device and includes the unique device identifier.

14. The method of claim 12, wherein the cryptographic server is equipped with a display, and wherein the confirming an Internet-connected device comprises:
the cryptographic server displaying the registration code on the display; and
the registration code being provided to the online service through the Internet-connected device.

15. The method of claim 14, wherein the registration code is displayed in a form of a QR code, and wherein the QR code is scanned by the Internet-connected device.

16. The method of claim 12, wherein the confirming an Internet-connected device further comprises:
   the online service sending the registration code to the cryptographic server.

17. The method of claim 1, wherein the cryptographic server authenticating the user supports single sign-on between the user and the third-party service.

18. The method of claim 1, further comprising, for the each user:
   the online service associating an identity of the user with the cryptographic server;
   in response to the online service receiving the request for access by the user to the third-party service, the online service requesting an identity from the user; and
   in response to the online service receiving the identity from the user, the online service connecting to the cryptographic server.

\* \* \* \* \*